United States Patent
Reardon et al.

(10) Patent No.: US 6,698,560 B2
(45) Date of Patent: Mar. 2, 2004

(54) CORD HOLDER DEVICE

(76) Inventors: Gavin Reardon, 2118 Wilshire Dr. Blvd. #615, Santa Monica, CA (US) 90403; Carrie Lyons, 2118 Wilshire Dr. Blvd. #615, Santa Monica, CA (US) 90403

( * ) Notice: Subject to any disclaimer, the term of this patent is extended or adjusted under 35 U.S.C. 154(b) by 0 days.

(21) Appl. No.: 10/134,925

(22) Filed: Apr. 29, 2002

(65) Prior Publication Data

US 2003/0201142 A1 Oct. 30, 2003

(51) Int. Cl.[7] ............................................. H02G 11/02
(52) U.S. Cl. ................. 191/12 R; 191/12.4; 242/385.4; 379/446
(58) Field of Search ..................... 191/12.2 R, 12 R, 191/12.4, 12.2 A; 242/385.4; 379/441, 446, 438, 442, 447, 433

(56) References Cited

U.S. PATENT DOCUMENTS

| | | | | |
|---|---|---|---|---|
| 1,843,743 A | * | 2/1932 | Shaffer | 191/12 R |
| 4,472,860 A | * | 9/1984 | Osterlind | 24/129 R |
| 4,658,465 A | * | 4/1987 | Keane et al. | 15/323 |
| 5,388,155 A | * | 2/1995 | Smith | 379/446 |
| 5,819,894 A | * | 10/1998 | Okamoto | 191/12.4 |
| 5,961,062 A | * | 10/1999 | Beihl | 242/400.1 |
| 6,095,075 A | * | 8/2000 | Gordon et al. | 114/230.23 |
| 6,149,457 A | * | 11/2000 | Liao | 439/501 |
| 6,199,674 B1 | * | 3/2001 | Liao | 191/12.4 |
| 6,374,970 B1 | * | 4/2002 | Liao | 191/12.4 |
| 6,484,787 B1 | * | 11/2002 | Walters | 160/178.1 R |

* cited by examiner

*Primary Examiner*—Frantz F. Jules
(74) *Attorney, Agent, or Firm*—Mayer, Brown, Rowe & Maw

(57) ABSTRACT

A cord retention device for a personally carried appliance such as a cell phone is disclosed. The cell phone has a cord which is attached to a microphone and ear piece for hands free operation of the phone. One example of the invention includes a base member having a back surface with adhesive for attachment to the appliance. The opposite surface of the base member has a pair of prongs. The cord may be wrapped around the prongs when not in use. Another example of the invention includes the installation of retractable prongs on the side of the cell phone. The prongs may be extended and locked in place thus allowing the cord to be wrapped when not in use. The prongs may be retracted to be flush with a surface of the appliance when a cord is not used with the appliance.

20 Claims, 4 Drawing Sheets

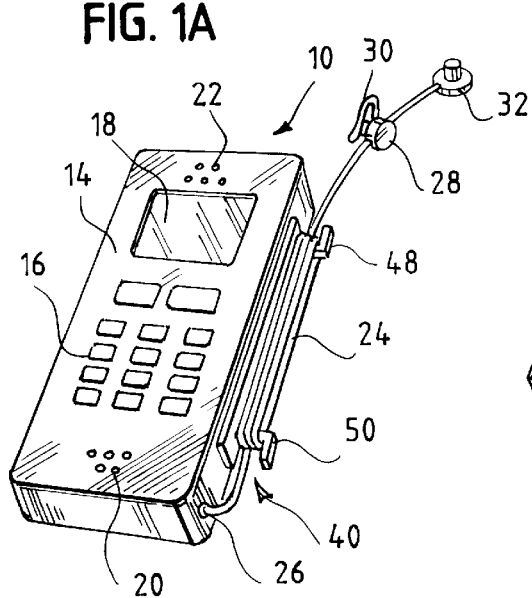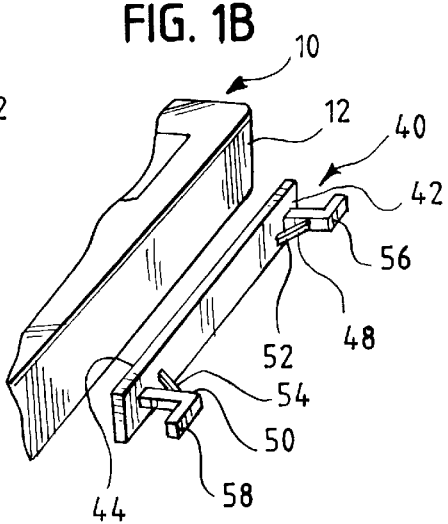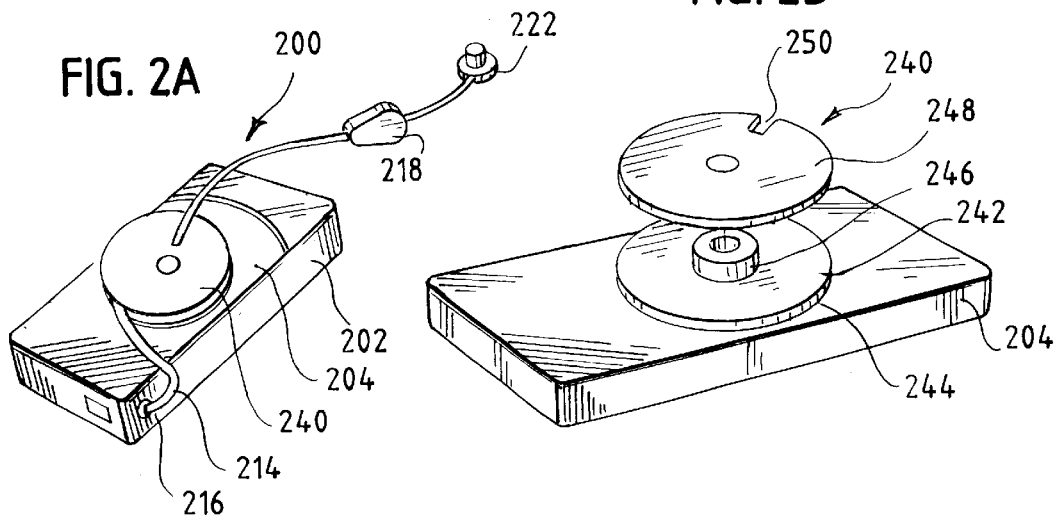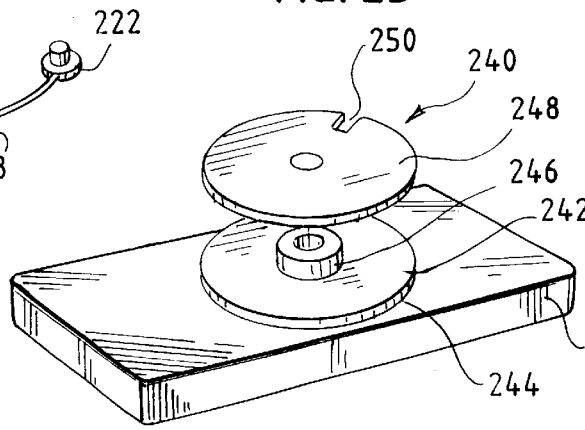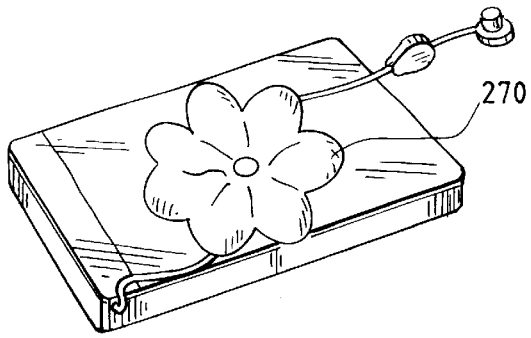

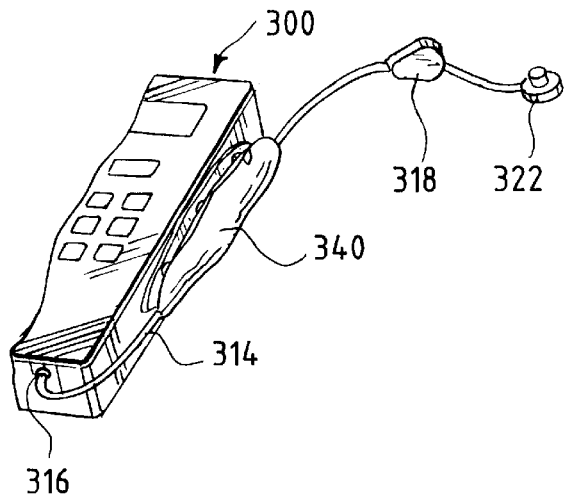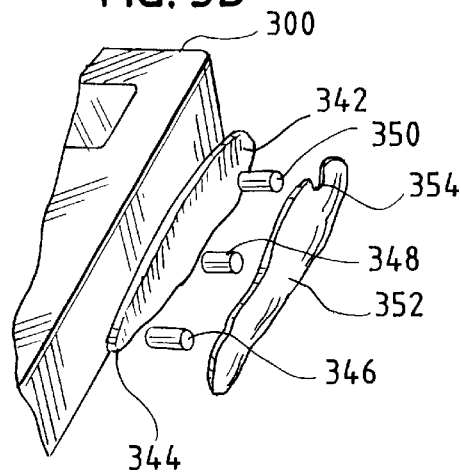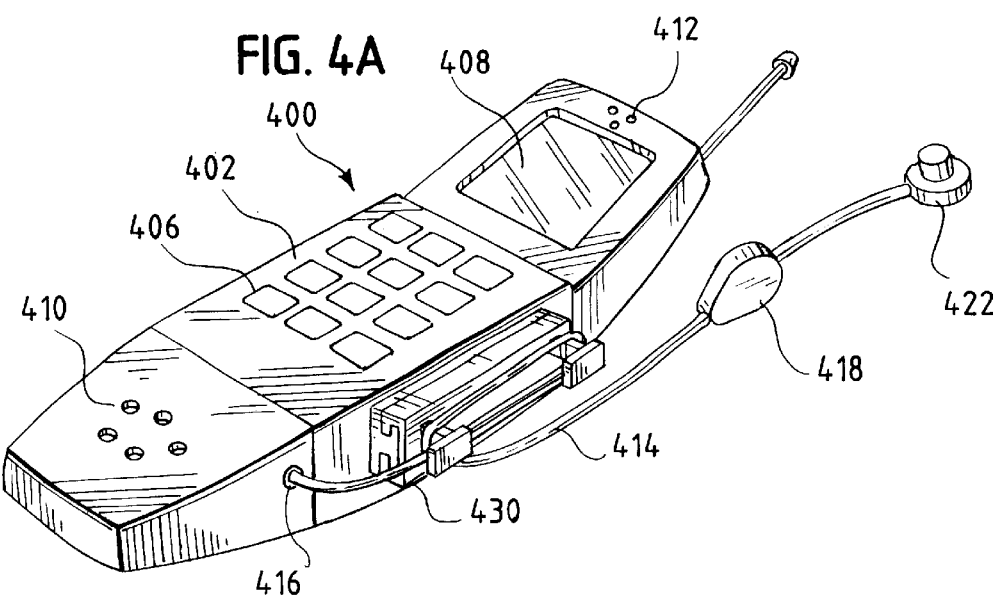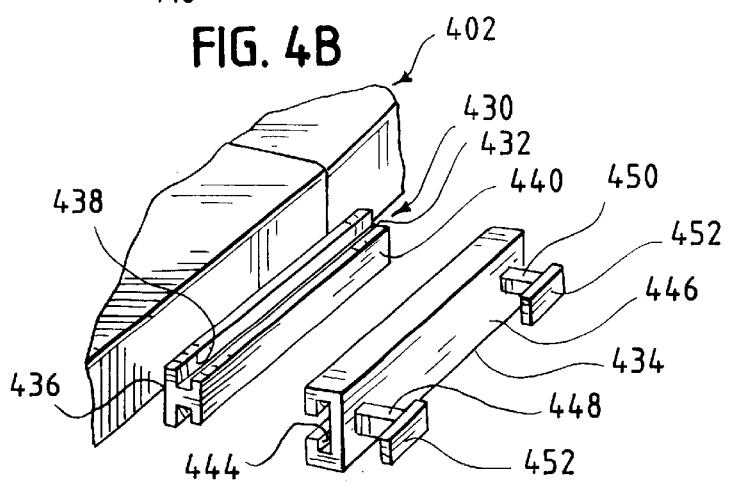

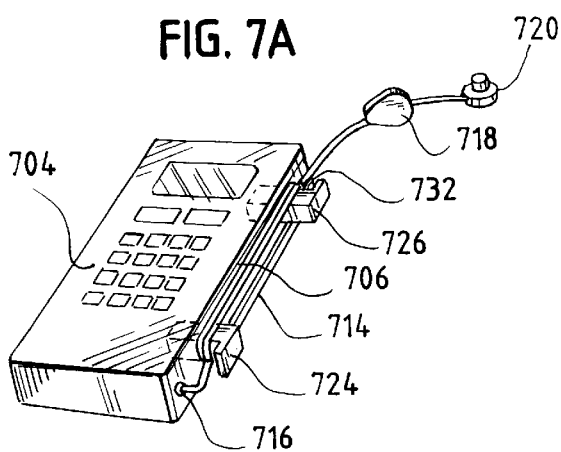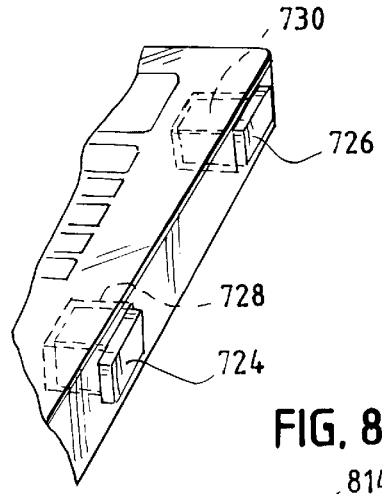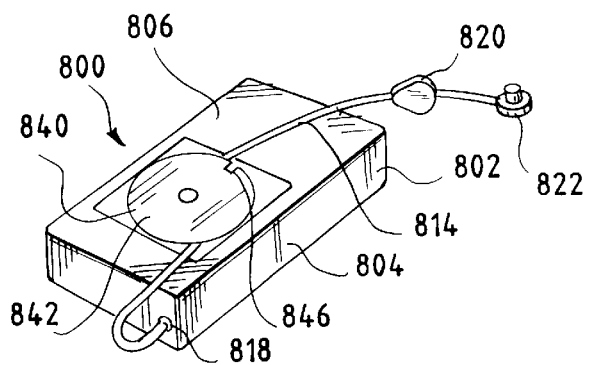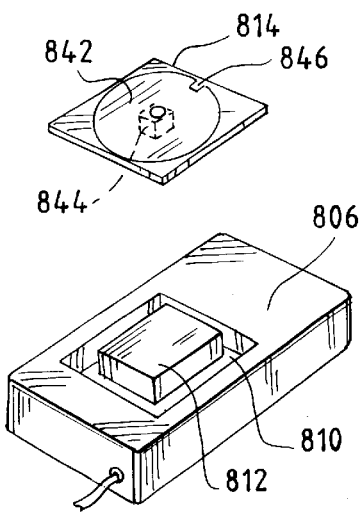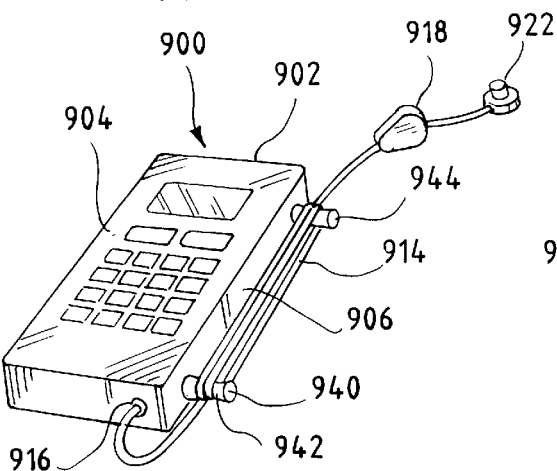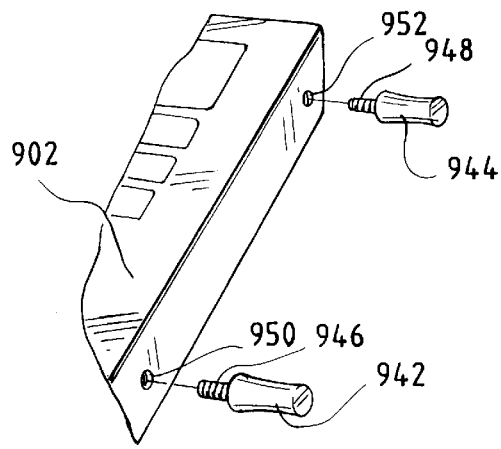

CORD HOLDER DEVICE

FIELD OF INVENTION

This invention relates to a device for holding the cord of a personally carried appliance, and more specifically an attachable holder with hook members which may be used to wrap the cord for storage and to prevent tangling.

BACKGROUND OF INVENTION

Handheld or personal appliances such as cell phones increasing have attachments connected to cords for greater convenience. For example, in the case of a cell phone, a cord may be used for a microphone and ear piece allowing a user to clip the cell phone on their belt and use their hands while simultaneously using the cell phone. Such convenience may also provide safety when using the phone in a vehicle. Other examples of cords may be for an ear piece or head phones for a personal entertainment device such as a portable CD, PDA, cassette tape, digital tape or DVD player.

Unfortunately, when not in use the cords, may be lost making the use of the appliance in the hands free mode unavailable. Furthermore, when not in use, the cords may become tangled which also prevents their optimal use. Even when used, problems may occur as cords for such devices must be of longer lengths than needed. The optimal length of a cord depends on a user's height, but the cord must be as long as possible to accommodate users of different heights. This often results in tangling the cord when in use resulting in great inconvenience to the user.

Thus, there is a need for a simple mechanism to insure that only the optimal length of cord is used with a personally carried appliance. There is a further need for a simple mechanism to hold a cord which may be installed on presently existing personally carried appliance. Finally, there is a need for a personally carried device with a cord and a holder for the cords.

SUMMARY OF THE INVENTION

These needs and others may be met by the present invention which has an aspect which is a cord holder for holding a cord attached to an appliance capable of being carried on a person. The cord holder has a holding member coupled to the appliance and the cord may be wrapped around the holding member.

Another aspect of the present invention is a personally carried appliance with a cord attachment. The appliance has a main body and a cord retention device attached to the main body capable of holding the cord.

Another aspect of the present invention is a cord holder device for use with a cellular telephone. The cellular telephone has a substantially flat side surface and a cord having one end attached to a jack on the telephone and an opposite end attached to a microphone and an ear piece. The cord holder device has a base piece having a back surface with adhesive attachable to the flat side surface of the cellular telephone. A pair of prongs extends from an opposite top surface of the base. The prongs are capable of retaining the cord.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein:

FIG. 1A is a perspective view of an example of a cord holder according to the present invention installed on the side of a cell phone with a cord;

FIG. 1B is an exploded perspective view of the cord holder shown in FIG. 1A;

FIG. 2A is a perspective view of a second example of a cord holder according to the present invention installed on the back of a cell phone with a cord;

FIG. 2B is an exploded perspective view of the cord holder shown in FIG. 2A;

FIG. 2C is an alternate shaped design of the cord holder shown in FIG. 2A;

FIG. 3A is a perspective view of an example of a cord holder having a top piece supported by pins on an adhesively attached base according to the present invention installed on the side of a cell phone with a cord;

FIG. 3B is an exploded perspective view of the cord holder shown in FIG. 3A;

FIG. 4A is a perspective view of a fourth example of a cord holder having a slide-in mechanism according to the present invention installed on a cell phone with a cord;

FIG. 4B is an exploded perspective view of the cord holder shown in FIG. 4A;

FIG. 7A is a perspective view of a seventh example of a cord holder device in conjunction with a cell phone with cords where the prongs are extended;

FIG. 7B is a perspective view of the cord holder device in FIG. 7A with the prongs retracted;

FIG. 8A is a perspective view of a eighth example of a cord holder device in conjunction with a cell phone with cords;

FIG. 8B is a perspective exploded view of the cord holder device in FIG. 8A;

FIG. 9A is a perspective view of a ninth example of a cord holder device in conjunction with a cell phone with cords where the prongs are attached; and FIG. 9B is a perspective view of the cord holder device in FIG. 9A with the prongs detached.

DESCRIPTION OF THE PREFERRED EMBODIMENT

Figure 5A:
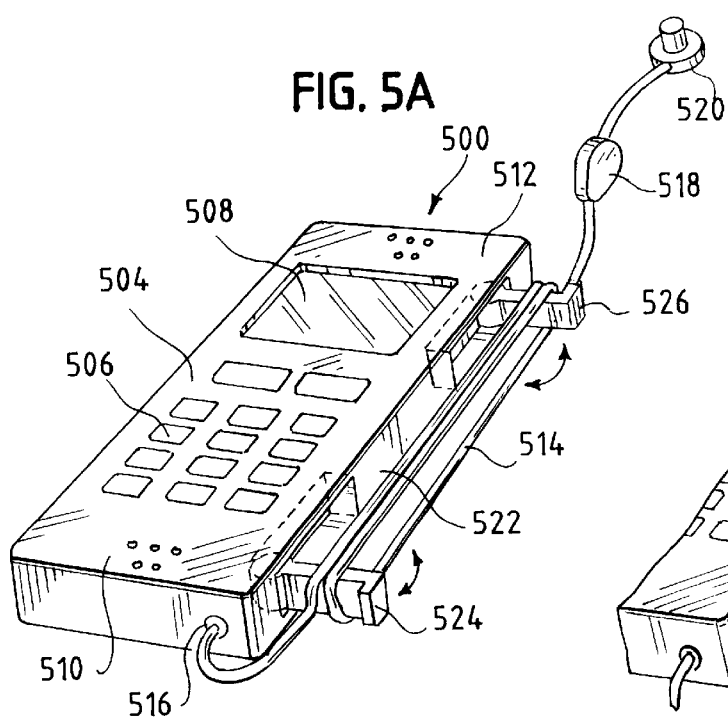
FIG. 5A is a perspective view of a fifth example of a cord holder device in conjunction with a cell phone with cords where the prongs are extended.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIGS. 1A & 1B show an example of the present invention which is used in conjunction with a carried appliance such as a cell phone 10. The cell phone 10 has a main body 14 with a face plate 12 having a key pad 16. Various information may be displayed on a display 18. Normally a user speaks through an imbedded microphone 20 and listens through a speaker 22 mounted on the cell phone 10. The phone 10 has a clip (not shown) which allows it to be attached to a user's belt when not in use.

The phone 10 may be operated in a hands free mode. A cord 24 has one end which is plugged into a jack 26 and a second end which has a microphone 28. The jack 26 functions to provide the output audio signals and the input signals to the cell phone 10 in place of the microphone 20 and speaker 22. A clip 30 is attached to the cord 24 near the microphone 28 to fix the microphone 28 near a user's mouth. The second end of the cord 24 is also attached to an ear piece 32. In this manner, a user may clip the cell phone 10 to their clothing and use the microphone 28 and ear piece 32 to leave their hands free.

A cord holder device 40 is attached to cell phone 10 to provide a place to wrap the spare length of the cord 24 and to store the cord 24 when not in use. The cord holder device 40 has a base piece 42 which has a back surface 44 in contact with the side of the phone 10. The back surface 44 is coated with an adhesive to insure that the cord holder 40 stays attached to the phone 10. In the preferred embodiment, a strip of paper may be placed on the back surface 44 which may be peeled off shortly before attaching the cord holder device 40 to the phone 10.

The base piece 42 has a front surface 46 which has a pair of hook members 48 and 50. The hook members 48 and 50 are reinforced by supports 52 and 54 respectively. The top ends of the hook members 48 and 50 have a tab 56 and 58 respectively which allows the cord 24 to be held on the hook members 48 and 50. Of course the hook members 48 and 50 may be of any shape which allows them to retain the cord 24. When the cord 24 is not in use, is may be wrapped around the hook members 48 and 50. Additionally, the spare length of the cord 24 may be wrapped around the hook members 48 and 50 in order to minimize the chance of tangling when the microphone 28 and ear piece 32 are in use.

FIGS. 2A & 2B show a second example of the present invention which is used in conjunction with a carried appliance such as a cell phone 200 which may be operated in a hands free mode. The cell phone 200 has a front surface 202 with an opposite back surface 204. A cord 214 has one end which is plugged into a jack 216 and a second end which has a microphone 218 and an ear piece 222. The jack 216 functions to provide the output audio signals and the input signals to the cell phone 200. In this manner, a user may clip the cell phone 200 to their clothing and use the phone 200 via the microphone 218 and ear piece 222 leaving their hands free.

A cord holder device 240 is attached to the back surface 204 of the cell phone 200 to provide a place to wrap the spare length of the cord 214 and to store the cord 214 when not in use. The cord holder device 240 has a disk shaped base piece 242 which has a back surface 244 in contact with the back of the cell phone 200. The back surface 244 is coated with an adhesive to insure that the cord holder 240 stays attached to the phone 200. In the preferred embodiment, a strip of paper is placed on the back surface 244 which may be peeled off shortly before attaching the cord holder device 240 to the phone 200.

One end of a support 246 is mounted on the base piece 242 opposite the back surface 244. The opposite end of the support 246 is mounted to a disk shaped top piece 248. The top piece 248 has a notch 250. Of course it is to be understood that the base and top pieces 242 and 248 may be of any shape (i.e. square, rectangle, oval etc.) which is sufficient to cover the cord 214 when wrapped around the support 246. For example, a decorative shape such as flower shaped top piece 270 as shown in FIG. 2C may be used for aesthetic effect.

When the cord 214 is not in use, is may be wrapped around the support 246 between the base and top pieces 242 and 248. The ear piece 222 may be retained by inserting the end of the cord 214 in the notch 250. Additionally, the spare length of the cord 214 may be wrapped around the support 246 in order to minimize the chance of tangling when the microphone 218 and ear piece 222 are in use.

FIGS. 3A & 3B show a third example of the present invention which is used in conjunction with a carried appliance such as a cell phone 300 which may be operated in a hands free mode. A cord 314 has one end which is plugged into a jack 316 and a second end which has a microphone 318 and an ear piece 322. The jack 316 functions to provide the output audio signals and the input signals to the cell phone 300. In this manner, a user may clip the cell phone 300 to their clothing and use the phone 300 via the microphone 318 and ear piece 322 leaving their hands free.

A cord holder device 340 is attached to the side of the cell phone 300 to provide a place to wrap the spare length of the cord 314 and to store the cord 314 when not in use. The cord holder device 340 has a base piece 342 which has a back surface 344 in contact with the back of the cell phone 300. The back surface 344 is coated with an adhesive to insure that the cord holder 340 stays attached to the phone 300. In the preferred embodiment, a strip of paper is placed on the back surface 344 which may be peeled off shortly before attaching the cord holder device 340 to the phone 300.

A series of three pins 346, 348 and 350 are mounted on the opposite surface from the back surface 344 of the base piece 342. The pins 346, 348 and 350 are also attached to a top piece 352. The top piece 352 has a notch 354. When the cord 314 is not in use, is may be wrapped around the pins 346, 348 and 350 between the base and top pieces 342 and 352. The ear piece 322 may be retained by inserting the end of the cord 314 in the notch 354. Additionally, the spare length of the cord 314 may be wrapped around the pins 346, 348 and 350 in order to minimize the chance of tangling when the microphone 318 and ear piece 322 are in use. Of course, the base and top pieces 342 and 352 may have any shape which conforms to the dimensions of the side of the cell phone 300 and function to retain the cord 314. In addition, any number of pins may be used to separate the base and top pieces 342 and 352.

FIGS. 4A–4B show a fourth example of the present invention which is used in conjunction with a personally carried appliance such as a cell phone 400. The cell phone 400 has a main body 402 with a face plate 404 having a keypad 406. Various information may be displayed on a display 408. Normally a user speaks through a microphone 410 and listens through a speaker 412 mounted on the cell phone 400. The phone 400 has a clip (not shown) which allows it to be attached to a user's belt when not in use.

The phone 400 may be operated in a hands free mode. A cord 414 has one end which is plugged into a jack 416 and a second end which has a microphone 418. A clip 420 is attached to the cord 414 near the microphone 418 to fix the microphone 418 near a user's mouth. The cord 414 is also attached to an ear piece 422. In this manner, a user may clip the cell phone 400 to their clothing and use the phone via the microphone 418 and ear piece 422 leaving their hands free.

In order to prevent the cord 414 from becoming tangled, a cord holder device 430 is attached to the cell phone 400. The cord holder device 430 has a base piece 432 and a top piece 434. The base piece has a contact surface 436 which may preferably have an adhesive so it may be joined to the main body of the phone 400. In such a manner, the cord holder device 430 may be utilized with existing cell phones. The base piece 430 has a top surface 438 with a T-shaped track 440.

The top piece 434 has a back surface 442 which is formed to provide a groove 444. The groove 444 is shaped to match the T-shaped track 440. The friction between the T-shaped track 440 and the groove 444 fixes the top piece 434 in relation to the base piece 430. The top piece 434 has a front surface 446 which has a pair of hook members 448 and 450 extending from it. The hook members 448 and 450 may have an end piece 452 and 454 respectfully in order to retain the cord 414.

As noted above, the holder 430 may be attached to an existing cell phone by exposing the adhesive on the contact surface 436 of the base piece 432. Preferably, a paper cover would be placed on the contact surface 436 and peeled off just prior to attaching the holder 430 to the cell phone 400.

When the cord 414 is not in use, it may be wrapped around the hook members 448 and 450. Additionally, the spare length of the cord 414 may be wrapped around the hook members 448 and 450 in order to minimize the chance of tangling when the microphone 418 and ear piece 422 are in use.

Figure 5B:
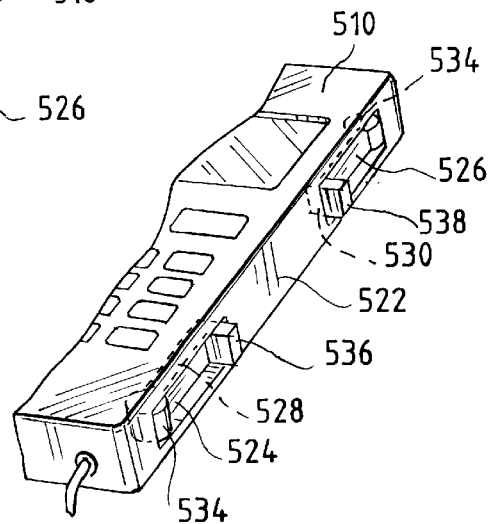
FIG. 5B is a perspective view of the cord holder device in FIG. 5A with the prongs retracted.

FIGS. 5A & 5B show a fifth example of the present invention which is used in conjunction with a carried appliance such as a cell phone 500 The cell phone 500 has a main body 502 with a face plate 504 having a keypad 506. Various information may be displayed on a display 508. Normally a user speaks through an imbedded microphone 510 and listens through a speaker 512 mounted on the cell phone 500. The phone 500 has a clip (not shown) which allows it to be attached to a user's belt when not in use.

A cord 514 has one end which is plugged into a jack 516 and a second end which has a microphone 518 and an ear piece 520. The jack 516 functions to provide the output audio signals and the input signals to the cell phone 500. In this manner, a user may clip the cell phone 500 to their clothing and use the phone 500 hands free via the microphone 518 and ear piece 520.

The main body 502 has a flat side wall 522. A pair of swiveling prongs 524 and 526 are stored in two respective slots 528 and 530 on the side wall 522. The swiveling prong 524 is attached at one end of the slot 528 via a hinge 532. The opposite swiveling prong 526 is attached at one end of the slot 530 via a hinge 534. The prongs 524 and 526 may be extended as shown in FIG. 5A and serve to provide a place to wrap the spare length of the cord 514 and to store the cord 514 when not in use. The opposite ends of the prongs 524 and 526 from the hinges 532 and 534 have a tab 536 and 538 to assist holding the cord 514.

When the user of the phone 500 does have a the cord, the prongs 524 and 526 may be folded down into the slots 528 and 530 respectively to be flush with the flat side wall 522.

Figure 6A:
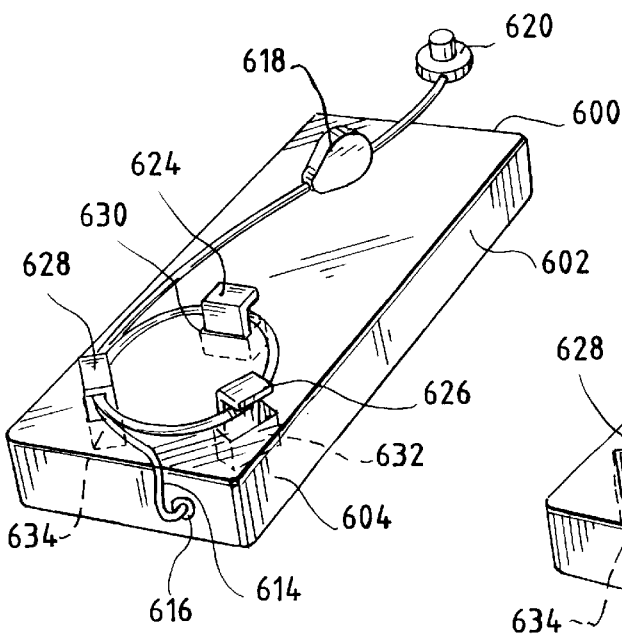
FIG. 6A is a perspective view of a sixth example of a cord holder device in conjunction with a cell phone with cords where the prongs are extended.
Figure 6B:
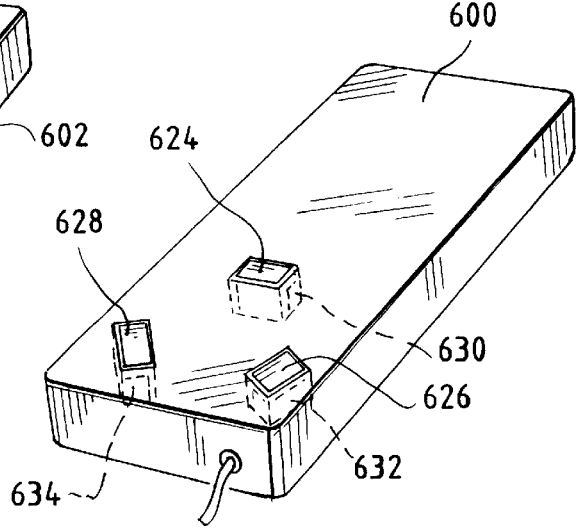
FIG. 6B is a perspective view of the cord holder device in FIG. 6A with the prongs retracted.

FIGS. 6A & 6B show a sixth example of the present invention which is used in conjunction with a carried appliance such as a cell phone 600. The cell phone 600 has a main body 602 with a face plate 604. A back surface 606 of the main body 602 is substantially flat. The phone 600 has a clip (not shown) which allows it to be attached to a user's belt when not in use.

A cord 614 has one end which is plugged into a jack 616 and a second end which has a microphone 618 and an ear piece 620. The jack 616 functions to provide the output audio signals and the input signals to the cell phone 600. In this manner, a user may clip the cell phone 600 to their clothing and use the phone 600 hands free via the microphone 618 and ear piece 620.

Three retracting prongs 624, 626 and 628 extend from the back surface 606. The retracting prongs 624, 626 and 628 are stored in three respective slots 630, 632 and 634 which are on the back surface 606. The prong 626 has a notch 638 to hold the ear piece 620 and cord 614. The prongs 624, 626 and 628 are spring loaded and may be locked into an extended position as shown in FIG. 6A or be retracted into the wells 630, 632 and 634 as shown in FIG. 6B.

The prongs 624, 626 and 628 serve to provide a place to wrap the spare length of the cord 614 and to store the cord 614 when not in use. Of course, other mechanisms such as hinges may be used to retract the prongs 624, 626 and 628 to the back wall 606.

FIGS. 7A & 7B show a seventh example of the present invention which is used in conjunction with a carried appliance such as a cell phone 700. The cell phone 700 has a a main body 702 with a face plate 704. A side wall 706 of the main body 702 is substantially flat. The phone 700 has a clip (not shown) which allows it to be attached to a user's belt when not in use.

A cord 714 has one end which is plugged into a jack 716 and a second end which has a microphone 718 and an ear piece 720. The jack 716 functions to provide the output audio signals and the input signals to the cell phone 700. In this manner, a user may clip the cell phone 700 to their clothing and use the phone 700 hands free via the microphone 718 and ear piece 720.

Two retracting prongs 724 and 726 extend from the side wall 706. The retracting prongs 724 and 726 are stored in two respective wells 728 and 730 which are spaced from each other on the side wall 706 of the cell phone 700. The prong 726 has a notch 732 to hold the ear piece 720 and cord 714. The prongs 724 and 726 are spring loaded and may be locked into an extended position as shown in FIG. 7A or be retracted into the wells 728 and 730 as shown in FIG. 7B. The prongs 724 and 726 serve to provide a place to wrap the spare length of the cord 714 and to store the cord 714 when not in use.

FIGS. 8A & 8B show an eighth example of the present invention which is used in conjunction with a carried appliance such as a cell phone 800. The cell phone 800 has a main body 802 and a face plate 804. The face plate 804 has a keypad and display (not shown). The main body 802 has a back surface 806 opposite of the face plate 804. The back surface 806 has a battery compartment 810 which contains a battery 812 which powers the cell phone 800. The battery compartment 810 has a cover 814 which locks the battery 812 into the compartment 810. The phone 800 has a clip (not shown) which allows it to be attached to a user's belt when not in use.

A cord 816 has one end which is plugged into a jack 818 and a second end which has a microphone 820 and an ear piece 822. The jack 818 functions to provide the output audio signals and the input signals to the cell phone 800. In this manner, a user may clip the cell phone 800 to their clothing and use the phone 800 hands free via the microphone 820 and ear piece 822.

A cord holder device 840 is attached to the back surface 806 of the cell phone 800 to provide a place to wrap the spare length of the cord 816 and to store the cord 816 when not in use. The cord holder device 840 has a disk shaped top piece 842 which is supported by one end of a cylindrical support 844. The opposite end of the cylindrical support 844 is attached to the cover 812 of the battery compartment 810. The top piece 842 has a notch 846. Of course it is to be understood that the top piece 842 may be of any shape (i.e. square, rectangle, oval etc.) which is sufficient to cover the cord 816 when it is wrapped around the support 844. When the cord 816 is not in use, is may be wrapped around the support 844 between the cover 812 and the top piece 842. The ear piece 822 may be retained by inserting the end of the cord 816 in the notch 846. Additionally, the spare length of the cord 816 may be wrapped around the support 844 in order to minimize the chance of tangling when the microphone 820 and ear piece 822 are in use.

FIGS. 9A & 9B show a ninth example of the present invention which is used in conjunction with a carried appliance such as a cell phone 900 which may be operated in a hands free mode. The cell phone 900 has a main body 902 which has a face plate 904. The main body 902 has a flat side 906. A cord 914 has one end which is plugged into a jack 916 and a second end which has a microphone 918 and an ear piece 922. The jack 916 functions to provide the output audio signals and the input signals to the cell phone 900. In this manner, a user may clip the cell phone 900 to their clothing and use the phone 900 via the microphone 918 and ear piece 922 leaving their hands free.

A cord holder device 940 is attached to the side wall 906 of the cell phone 900 to provide a place to wrap the spare length of the cord 914 and to store the cord 914 when not in use. The cord holder device 940 has a pair of hook members 942 and 944 which are connected to the side wall 906. The hook members 942 and 944 each have a threaded end 946 and 948 respectively. The threaded ends 946 and 948 are threaded into holes 950 and 952 which are located in the side wall 906.

When the cord 914 is not in use, it may be wrapped around the hook members 942 and 944. The spare length of the cord 914 may be wrapped around the hook members 942 and 944 in order to minimize the chance of tangling when the microphone 918 and ear piece 922 are in use. Of course, other means of attachment may be used to attach the hook members 942 and 944 to the holes 950 and 952 in the side wall 906 such as through friction. Additionally, different numbers of hooks may be used. Finally, the hook members 942 and 944 may be removed and replaced if desired.

It will be apparent to those skilled in the art that various modifications and variations can be made in the method and system of the present invention without departing from the spirit or scope of the invention. For example, other appliances such as compact disc players, cassette tape players, digital tape players, personal digital assistants or DVD players which are carried on a person with cords may use the concepts of the invention. Thus, the present invention is not limited by the foregoing descriptions but is intended to cover all modifications and variations that come within the scope of the spirit of the invention and the claims that follow.

What is claimed is:

1. A cord holder for holding a cord attached to an appliance capable of being carried on a person, the cord holder comprising:
   a rigid holding member coupled to an exterior surface of the appliance;
   wherein the cord may be wrapped around the holding member and wherein the holding member includes a pair of hook members extending from the holding member and wherein the holding member is attached to the appliance with an adhesive.

2. The cord holder of claim 1 wherein the holding member includes:
   a base member attached to the exterior surface of the appliance;
   a support member mounted on the base member; and
   a top member mounted on the support member.

3. The cord holder of claim 2 wherein the base member and top member are circular in shape.

4. The cord holder of claim 3 wherein the top member has a notch sufficient to accommodate the cord.

5. The cord holder of claim 1 wherein the appliance is a cell phone.

6. The cord holder of claim 5 wherein the cord is coupled to a microphone and an ear piece.

7. A cord holder for holding a cord attached to an appliance capable of being carried on a person, the cord holder comprising:
   a holding member coupled to the appliance;
   wherein the cord may be wrapped around the holding member,
   wherein the holding member includes:
      a base member attached to the appliance;
      a support mounted on the base member; and
      a top member mounted on the support member; and
      wherein the base member is attached to the appliance with an adhesive.

8. A cord holder for holding a cord attached to an appliance capable of being carried on a person, the cord holder comprising:
   a holding member coupled to the appliance;
   wherein the cord may be wrapped around the holding member
   wherein the holding member includes:
      a base member having a bottom surface adhesively attached to the appliance and a top surface having a guide track;
      a top member having a slot slidably in contact with the guide track; and
      a hook member mounted on the top member for receiving the cord.

9. A personally carried appliance with a cord attachment, the appliance comprising:
   a main body;
   a rigid cord retention device attached to an exterior surface of the main body capable of holding the cord attachment; and
   wherein the cord retention device includes a prong which may be extended from or retracted within the appliance.

10. The appliance of claim 9 wherein the prong is spring loaded within a well on the appliance.

11. The appliance of claim 9 wherein the prong is swiveled between the retracted position and the extended position.

12. The appliance of claim 9 wherein the prong has a tab at one end to retain the cord.

13. The appliance of claim 9 wherein the appliance further includes a front face, an opposite back surface and a side wall.

14. The appliance of claim 13 wherein the prong is extended from the side wall.

15. The appliance of claim 13 wherein the prong is extended from the back surface.

16. The appliance of claim 9 defined further as a cell phone having a front plate with a key pad and a display and further including a jack for insertion of the cord and the cord attachment is coupled to a microphone and an ear piece.

17. A personally carried appliance with a cord attachment, the appliance comprising:
- a main body;
- a cord retention device attached to the main body capable of holding the cord attachment;
- a prong which may be extended from or retracted within the appliance;
- a support having one end attached to the appliance and an opposite end; and
- a top member attached to the opposite end of the support.

18. The appliance of claim 17 wherein the top member is of a generally disk shape and includes a notch which is capable of holding the cord.

19. A personally carried appliance with a cord attachment, the appliance comprising:
- a main body;
- a rigid cord retention device attached to an exterior surface of the main body capable of holding the cord attachment; and
- wherein the cord retention device includes a prong having a threaded end inserted in a threaded hole in the appliance.

20. A cord holder device for use with a cellular telephone having a substantially flat side surface and a cord having one end attached to a jack on the telephone and an opposite end attached to a microphone and an ear piece, the cord holder device comprising:
- a base piece having a back surface with adhesive attachable to the flat side surface of the cellular telephone; and
- a pair of prongs extending from an opposite top surface of the base, the prongs capable of retaining the cord.

* * * * *